US008343301B2

(12) United States Patent
Chung

(10) Patent No.: US 8,343,301 B2

(45) Date of Patent: Jan. 1, 2013

(54) METHOD FOR MANUFACTURING INTERIOR MATERIAL USING TRANSFER PAPER AND INTERIOR MATERIAL MADE USING THE METHOD

(76) Inventor: Doo Ho Chung, Seoul (KR)

( * ) Notice: Subject to any disclaimer, the term of this patent is extended or adjusted under 35 U.S.C. 154(b) by 174 days.

(21) Appl. No.: 12/675,752

(22) PCT Filed: Aug. 27, 2008

(86) PCT No.: PCT/KR2008/005010
§ 371 (c)(1),
(2), (4) Date: Feb. 26, 2010

(87) PCT Pub. No.: WO2009/038292
PCT Pub. Date: Mar. 26, 2009

(65) Prior Publication Data

US 2010/0230045 A1 Sep. 16, 2010

(30) Foreign Application Priority Data

Sep. 18, 2007 (KR) ........................ 10-2007-0094866

(51) Int. Cl.

| | |
|---|---|
| ***C09J 5/02*** | (2006.01) |
| ***B32B 37/14*** | (2006.01) |
| ***B32B 37/26*** | (2006.01) |
| ***B32B 38/14*** | (2006.01) |
| *C09J 5/06* | (2006.01) |
| *B29C 65/48* | (2006.01) |

(52) U.S. Cl. .................................... 156/308.6; 156/277

(58) Field of Classification Search .................. 156/277, 156/308.6

See application file for complete search history.

(56) References Cited

U.S. PATENT DOCUMENTS

| | | | | |
|---|---|---|---|---|
| 3,928,710 A * | 12/1975 | Arnold et al. | ................ | 428/483 |
| 4,550,052 A | 10/1985 | Malek | | |
| 5,207,851 A | 5/1993 | Abrams | | |
| 6,004,718 A * | 12/1999 | Shinohara | ..................... | 430/200 |
| 6,641,696 B1 * | 11/2003 | Edgerton | ...................... | 156/277 |
| 7,052,761 B2 * | 5/2006 | Pierson et al. | ................ | 428/172 |

(Continued)

FOREIGN PATENT DOCUMENTS

JP 58-065691 4/1983

(Continued)

*Primary Examiner* — Sonya Mazumdar

(74) *Attorney, Agent, or Firm* — Robert D. Atkins; Patent Law Group: Atkins and Associates, P.C.

(57) ABSTRACT

The present invention provides a method of manufacturing interior material using transfer paper, the method comprising the steps of: processing release paper for coating a surface of the release paper with a release agent; coating an acryl resin layer for coating the surface of the release paper manufactured in the release paper processing with an acryl resin layer in order to improve a printing eligibility of the surface of the release paper for a convenient digital printing; printing images for printing various designs such as pictures, figures or patterns desired by a customer on the acryl resin layer of the release paper formed in the acryl resin coating process through a digital ink jet printer in order to manufacture transfer paper; bonding a master sheet for bonding the images of the transfer paper manufactured through the image printing process to a master sheet to be transferred; and post-treating master sheet for bonding a surface paper layer or surface reinforcement layer to the surface of the master sheet on which images are transferred after the images are transferred to the master sheet through the master sheet bonding process in order to strengthen duration.

11 Claims, 4 Drawing Sheets

U.S. PATENT DOCUMENTS

| | | | | |
|---|---|---|---|---|
| 2003/0056891 | A1 * | 3/2003 | Schroder et al. .............. | 156/234 |
| 2004/0026017 | A1 * | 2/2004 | Taylor et al. .................. | 156/230 |
| 2006/0037693 | A1 * | 2/2006 | Wade ............................ | 156/234 |
| 2007/0039682 | A1 * | 2/2007 | Drake et al. .................. | 156/230 |

FOREIGN PATENT DOCUMENTS

| | | | | |
|---|---|---|---|---|
| JP | 1992-0017848 | | | 10/1992 |
| JP | 07-138540 | | | 5/1995 |
| KR | 19960021553 | A | * | 7/1996 |
| KR | 1019960021553 | | | 7/1996 |
| KR | 1020020027847 | A | | 4/2002 |
| KR | 2003028226 | A | * | 4/2003 |
| KR | 1020030028226 | A | | 4/2003 |

* cited by examiner

METHOD FOR MANUFACTURING INTERIOR MATERIAL USING TRANSFER PAPER AND INTERIOR MATERIAL MADE USING THE METHOD

CLAIM TO DOMESTIC PRIORITY

This application is a U.S. National Stage Application filed under 35 U.S.C. 371 claiming priority from International Application No. PCT/KR2008/005010, filed Aug, 27, 2008, which claims the benefit of Korean Application No. 10-2007-0094866, filed Sep. 18, 2007, and which applications are incorporated herein by reference.

FIELD OF THE INVENTION

The present invention relates to a method for manufacturing interior material using transfer paper, and more particularly, to a method for manufacturing interior material using transfer paper comprising the steps of proving transfer paper on which images are printed having high quality of printing superior to existing gravure printing way, applying the transfer paper to surfaces of interior material such as adhesive wall paper, sheet, floor material and tiles, etc. to form images so that working efficiency is improved and saving cost is achieved.

BACKGROUND OF THE INVENTION

Typically, interior material is attached or decorated inside the house in order to maximize interior effect thereof, and includes a master sheet layer on which images are printed for expressing various images or shapes on surfaces of a wall body, wallpaper, sheet and tile. Here, the interior material is used for improving the interior effect on the desired space.

In the prior art, in order to making the aforementioned interior material, the desired images are printed on the master sheet layer as a gravure printing layer among the interior materials of laminated structure.

For example, as shown in FIG. 1, the aforementioned method comprises generally the steps of: inputting master sheet for inputting paper or non-woven fabric 10; sol-coating on the upper part of the master sheet 20; foaming the coated-master sheet by heating it in an oven 30; and printing some images on the foamed-master sheet with gravure printing 40.

Additionally, in order to improve poor color and poor print caused from the gravure printing method in the prior art, as shown in FIG. 2, a transfer printing has been proposed in which the image is printed on a surface of a release paper using a roller 10-1 and the release paper is peeled off 10-2.

Meanwhile, in the prior method of manufacturing interior material, the gravure printing way applies equally to form images on a surface of a master sheet and as shown in FIG. 3, it is configured that a master sheet 2 is in contact with a printing roll in a state of ink being filled in a pocket 1*a* of the printing roll 1 so that the ink filled in the pocket 1*a* of the printing roll 1 is in contact evenly with the surface of the master sheet 2 to form an image thereon. However, in the prior gravure printing way, there arise problems in that the printing roll 1 is difficult to be in contact evenly with the surface of the master sheet so that high quality of printing is difficult to be obtained and further durability of the printing roll decreases as the procedures of the printing progress, causing precise printing to be difficult.

Further, when the durability of the printing roll decreases, since a metamerism phenomenon happens in which a color per lot varies pursuant to increasing the production amount, it is adapted for a mass production per lot under the gravure printing way, causing unnecessary stock of products.

Additionally, when the interior material is mass-produced according to the characteristics of the gravure printing way, the unsold products have to be stockpiled and it incurs the unnecessary cost of inventory management.

SUMMARY OF THE INVENTION

The present invention has been to solve the above drawbacks and the object of the invention is to provide a method of manufacturing interior material using transfer paper capable of various images being printed on a surface of a master sheet through the transfer paper manufactured through a digital ink jet printer and forming images on surfaces of interior material such as adhesion wall paper, sheet, floor material or tiles, etc. depending on a selection by a customer so that appearance effects may be characterized, working efficiency is improved due to decrease of failures in printing processes and non-stocked production way is possible by making products promptly on request, and thus it decreases cost.

In addition, the present invention provides a method of manufacturing interior material using transfer paper in which various images are formed on a surface of a master sheet through digital ink jet printing way so that designs made by a computer or existing stored-images are called to form on the surface of the master sheet and thus precise designs and images of high quality may be applied to a panel of interior material to improve interior effects.

Hereinafter, a method of manufacturing interior material using transfer paper will be described in detail.

To achieve the above object, the present invention provides a method of manufacturing interior material using transfer paper, the method comprising the steps of: processing release paper for coating a surface of the release paper with a release agent; coating an acryl resin layer for coating the surface of the release paper manufactured in the release paper processing with an acryl resin layer in order to improve a printing eligibility of the surface of the release paper for a convenient digital printing; printing images for printing various designs such as pictures, figures or patterns desired by a customer on the acryl resin layer of the release paper formed in the acryl resin coating process through a digital ink jet printer in order to manufacture transfer paper; bonding a master sheet for bonding the images of the transfer paper manufactured through the image printing process to a master sheet to be transferred; and post-treating master sheet for bonding a surface paper layer or surface reinforcement layer to the surface of the master sheet on which images are transferred after the images are transferred to the master sheet through the master sheet bonding process in order to strengthen duration. At this time, the image printing process further comprises the steps of: selecting images designed and stored by a computer or existing stored picture, figures or patterns by a customer; and mounting the release paper to a digital ink jet printer and printing the designs selected in the image selection process on the surface of the release paper. Additionally, after the post-treating process of the master sheet, the present invention further comprises a step of reinforcing a master sheet in which an adhesion layer is formed on a rear surface of the master sheet on which a printing layer is not formed in order to construct easily the master sheet and then a release paper is bonded thereon. Furthermore, the acryl resin layer to be coated to the surface of the release paper comprises acryl resin mixed with solid contents 10-20 weight %, and solvent organic flux 80-90 weight % with respect to total 100 weight %, and further the acryl resin is coated preferably on the surface of the release paper at 1-5 g per 1 $m^2$. Meanwhile, the present invention provides interior material using transfer paper manufactured according to the aforementioned ways.

According to the present invention, the following advantages are obtained.

Firstly, images are formed on a surface of a master sheet through a digital ink jet printer printing way superior to an existing gravure printing way so that interior material having a high quality of printing can be provided.

Secondly, the design desired by a customer is selected instead of existing mass production and printed on a surface of a master sheet through a digital ink jet printer so that customized interior material depending on user's tendency can be manufactured and various designs such as pictures and figures as well as existing patterns are applied on a surface of interior material to provide a small amount of interior material on which various images are formed to customers.

Thirdly, transfer paper on surface of which images are printed through a digital ink jet printer is manufactured and applied to surfaces of interior materials such as adhesive wall paper, sheet, floor material and tiles, etc. so that a working efficiency of indoor interior process is improved and stock rate is decreased to save cost.

Fourthly, various images can be formed on a surface of interior material to replace existing general purpose design and a customer can apply individually a special design to a product.

BRIEF DESCRIPTION OF THE DRAWINGS

The present invention will become more fully understood from the detailed description given hereinafter and the accompanying drawings which are given by way of illustration only and thus are not limitative of the present invention, and wherein.

DETAILED DESCRIPTION OF THE DRAWINGS

Embodiments of the present invention will now be described more fully with reference to the accompanying drawings, in which exemplary embodiments of the invention are shown. Before, describing the present invention, the present inventor has proposed a printing way through a transfer paper in order to overcome the drawbacks of the prior gravure printing way in which the images are printed on the surface of the master sheet to form the images on a surface of an interior material. Here, the present inventor has proposed a way of forming a silicon resin layer proper for a digital printing to improve quality of the printing formed the surface of the transfer paper through a digital ink jet printer.

Figure 1:
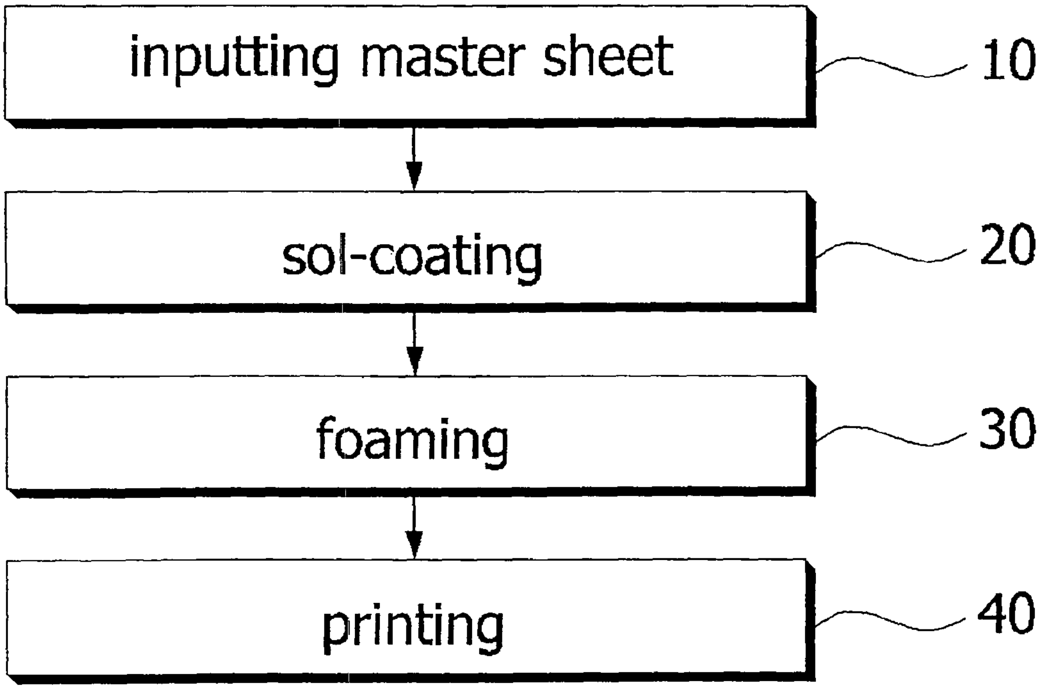
FIGS. 1 and 2 are flowcharts of a prior method of manufacturing interior material, respectively.
Figure 2:
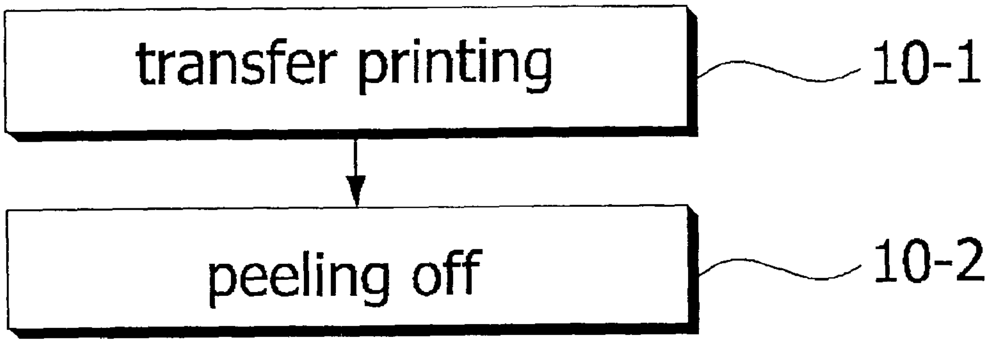
Figure 3:
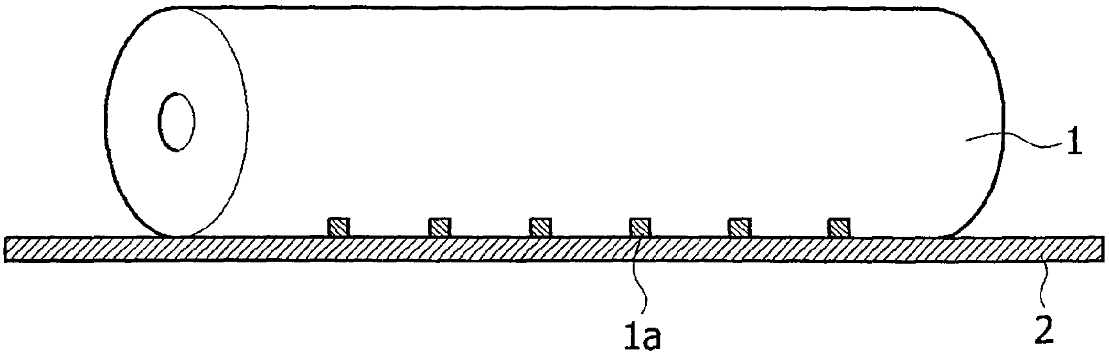
FIG. 3 is a view of illustrating a roll printing of the prior gravure printing method.
Figure 4:
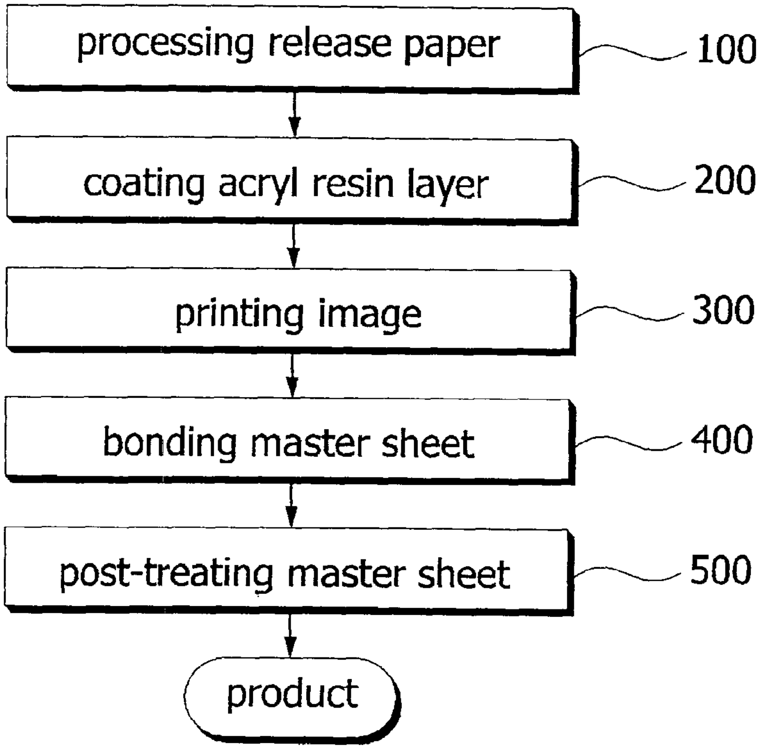
FIG. 4 a flowchart of a manufacturing method of interior material using transfer paper according to the present invention.

The present invention, as shown in FIG. 4, includes the steps of: a release paper processing for coating a small amount of release agent on a surface of release paper painted with silicon emulsion resin 100; an acryl resin coating in which the surface of release paper formed through the release paper processing step is coated thinly with acryl resin to improve printing property of the surface of release paper so that a digital printing is to be performed efficiently 200; images printing in which the acryl resin layer of the release paper formed in the acryl resin coating step 200 is printed with various images such as a desired picture, figure and pattern through the digital ink jet printer to manufacture the transfer paper 300; a master sheet bonding in which the image of the transfer paper manufactured through the image printing step 300 is bonded to the master sheet to be transferred 400; and a post treatment processing in which the image of the transfer paper is transferred to the master sheet through the master sheet bonding step 400 and then a surface layer or surface reinforcement layer is bonded to the surface of the master sheet on which images are transferred in order to reinforce duration of the master sheet 500.

Processing Release Paper 100

The above processing is performed by coating the surface of release paper with a small amount of release agent (material used for helping to be released easily). The release paper is used for ensuring an even printing surface and obtaining a printing result of a high resolution.

In the above processing, depending on a selection of printing inks, that is, when oil ink or water ink is used and a typical transfer paper is used, the release paper may be covered with a resin coating such as oil ink medium, etc. such that the oil ink for a digital ink jet printer is attached smoothly to the surface thereof. Here, when water ink for the digital ink jet printer is used, the release paper may be covered with a medium resin coating of water.

Process of Coating Acryl Resin 200

The above process is aimed at ensuring surface roughness by applying acryl resin layer so that the release paper surface performed through the release paper processing 100 is subject to a high quality printing.

At this time, the acryl resin layer to be coated to the surface of the release paper comprises acryl resin mixed with solid contents 10-20 weight %, and solvent organic flux 80-90 weight % with respect to total 100 weight %, and further the acryl resin is coated preferably on the surface of the release paper at 1-5 g per 1 $m^2$.

Furthermore, the acryl resin layer to be formed on the surface of the release paper is coated preferably with acryl resin consisting of solid content 10-20 weight % mixed with acryl 6-8 weight %, PVC 3-4 weight % and stabilizer 0.1-0.5 weight %, and solvent organic flux mixed with Methyl ethyl ketone (MEK) 65-75 weight %, toluene 10-20 weight % and Cyclohexane (CYC) 7-12 weight %.

For example, when the general transfer paper having a good surface roughness in order to solve poor printing eligibility caused from low surface roughness of the existing typical wall paper or master sheet for floor material, it is not to be matched with the ink for digital jet printer and thus the resin of acryl group having a similar composition of the ink for digital jet printer is coated thinly on the surface of the transfer paper to improve the printing eligibility.

Additionally, even when the acryl resin is coated, an acryl resin layer is formed thinly to improve a surface roughness of a printing.

Process of Printing Image 300

In the present process, various designs such as the desired image, picture, figure, and pattern by a user are printed through a digital ink jet printer on the resin layer of the release paper formed in the acryl resin coating process 200 to manufacture a transfer paper. That is, the images are printed in high quality through a digital ink jet printer so that the transfer paper on surface of which the various images are printed is manufactured. In particular, in the above digital ink jet printing process 300, when a large amount of silicon is used, a release property increases, whereas cohesion force decreases to cause an ink layer not to attach to a surface of the silicon resin layer. As a result, in order to improve adhesion force of the ink to be printed on a surface of the silicon resin layer, as described in the acryl resin coating process, a specially treated-resin is coated on the surface of the release paper at 1-5 g per 1 $m^2$. Additionally, a thickness of the acryl resin layer is to be formed thinly to ensure a surface roughness of the acryl resin layer.

Process of Bonding Master Sheet 400

The above process is performed such that the transfer paper manufactured through the image printing process 300 is in contact tightly with a surface of the master sheet and then heated thereto for the image of the transfer paper to be moved to the surface of the master sheet.

At this time, wall paper, sheet, floor material, and tile, etc. are used as the master sheet depending on user's selection, and further any interior material used for improving indoor interior effect may be used.

Process of Post-Treating the Master Sheet 500

The above process is performed such that the image of the transfer paper is transferred to the master sheet through the master sheet bonding process 400 and then a surface paper layer or surface reinforcement layer is bonded to the surface of the master sheet on which the image is transferred in order to strengthen duration of the master sheet.

Figure 5:
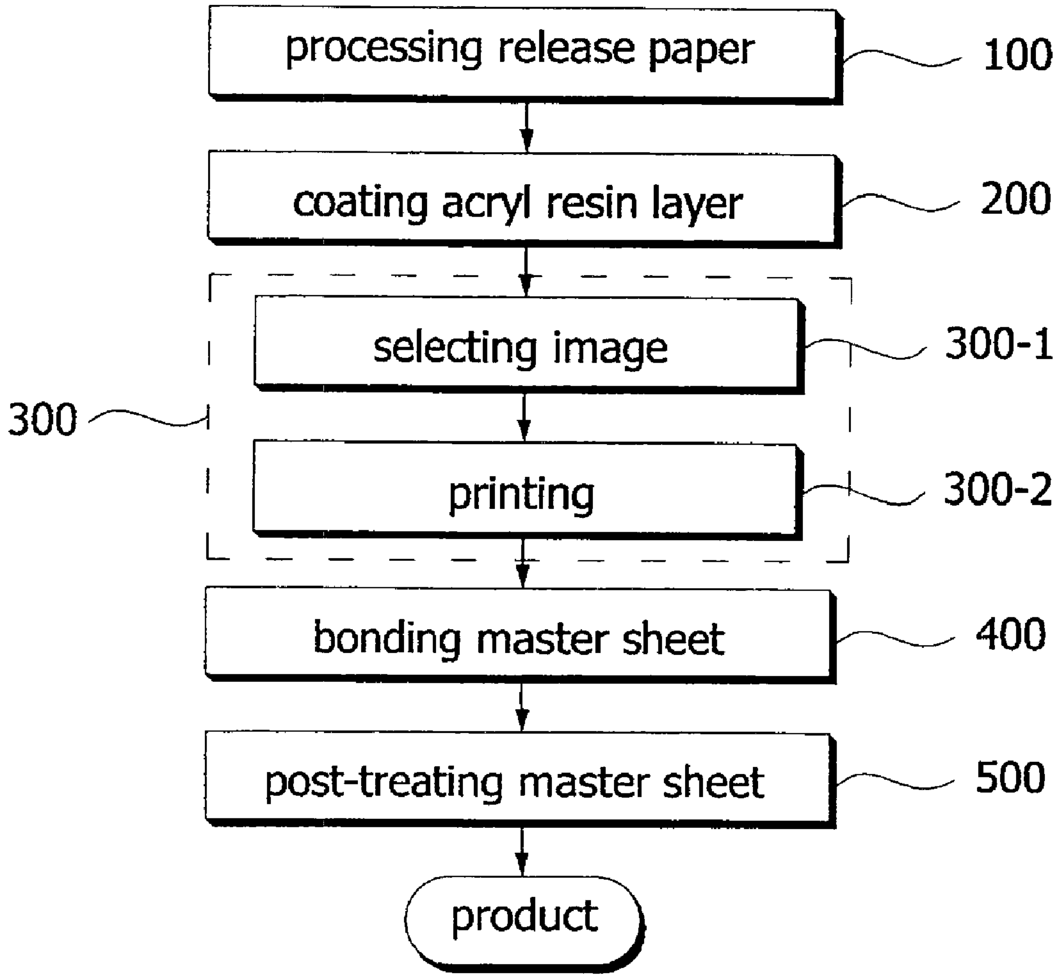
FIG. 5 is a flowchart of a manufacturing method of interior material using transfer paper according to another embodiment of the present invention.
Figure 6:
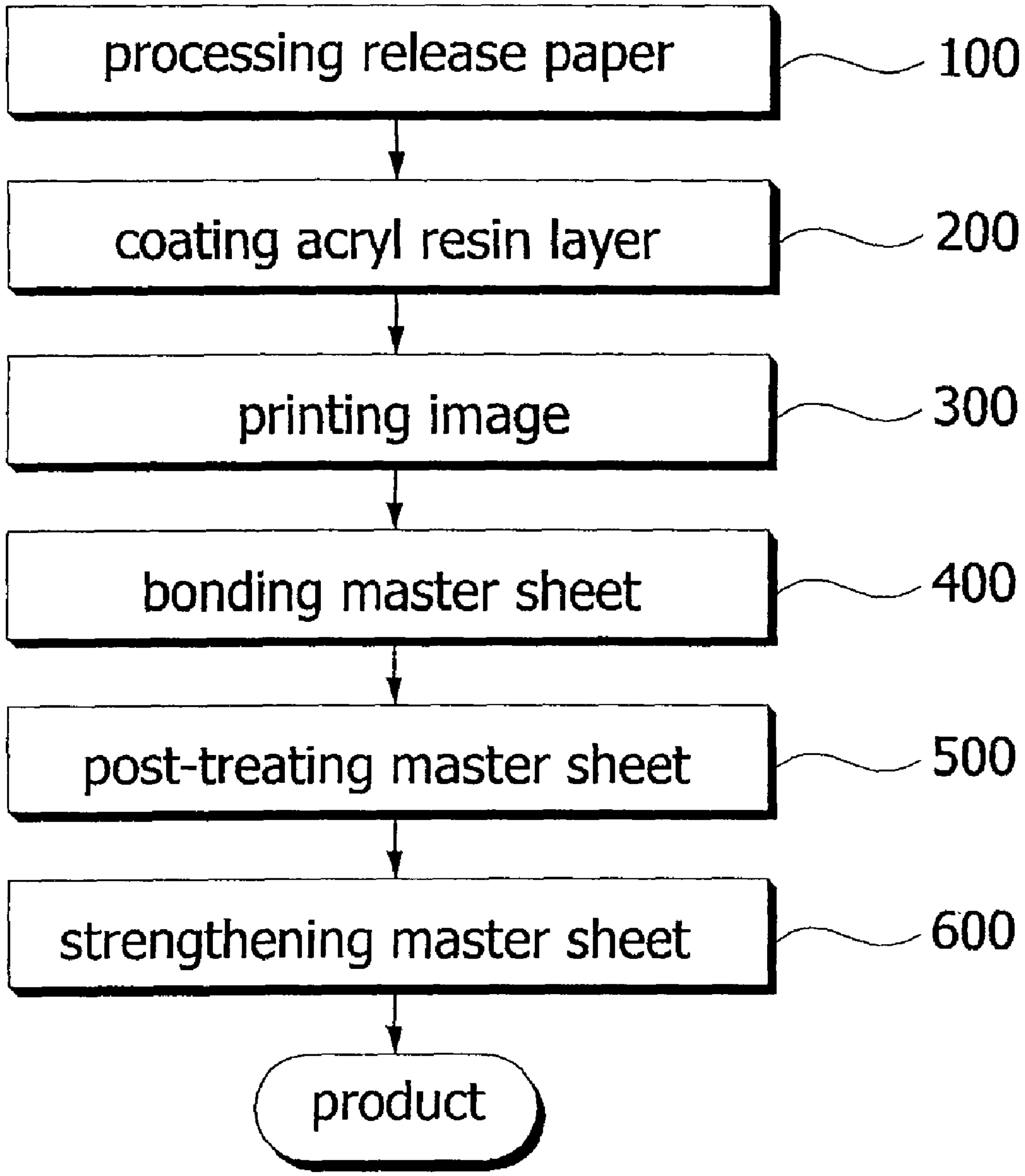
FIG. 6 is a flowchart of a manufacturing method of interior material using transfer paper according to another embodiment of the present invention.

Additionally, the present invention, as shown in FIG. 5, the image printing process further comprises steps of selecting and calling images of design made by a computer and stored thereon or various images such as picture, figure or pattern stored in a existing PC by a customer 300-1, and printing the picture, figure and pattern called in the image selection process 300-1 on a surface of the release paper 300

Furthermore, after the post-treating process of the master sheet 500, as shown in FIG. 5, the present invention further comprises of reinforcing a master sheet 600 in which an adhesion layer is formed on a rear surface of the master sheet on which a printing layer is not formed in order to construct easily the master sheet and then a release paper is bonded thereto, or tiles, PVC or MDF is adhered to the rear surface of the master sheet.

Hereinafter, embodiments for methods of manufacturing interior material using the transfer paper according to the present invention will be described.

A surface of a release paper was coated with a small amount of release agent. In addition, acryl resin mixed with solid contents 10-20 weight %, and solvent organic flux 80-90 weight % was coated thinly on the surface of the release paper at 1-5 g per 1 $m^2$, and then images of various pictures, figures or patterns were printed on the surface thereof through a digital ink jet printer to manufacture a transfer paper.

The transfer paper manufactured in Embodiment 1 was transferred to the surfaces of interior materials such as wall paper, sheet, floor material or PVC tiles to obtain the interior material on which the images were printed in a high quality.

Additionally, a surface paper layer or surface reinforcement layer was further formed on the surface of the master sheet, an adhesion layer was formed on a rear surface of the master sheet and a release paper was adhered thereon, or tiles, PVC or MDF were adhered to the rear surface of the master sheet to obtain the interior material that had a strong duration and could be constructed easily on a floor or wall surface.

As described above, the present invention provides a method of manufacturing interior material using transfer paper such that various images having a high quality of printing are formed on a surface of interior material used for indoor interior.

It will be apparent to those skilled in the art that modifications and variations can be made in the present invention without deviating from the spirit or scope of the invention. Thus, it is intended that the present invention cover any such modifications and variations of this invention provided they come within the scope of the appended claims and their equivalents. Accordingly, these and other changes and modifications are seen to be within the true spirit and scope of the invention as defined by the appended claims.

What is claimed is:

1. A method of manufacturing interior material using transfer paper, the method comprising the steps of:

processing release paper for coating a surface of the release paper with a silicon release agent (100);

coating an acryl resin layer for coating the surface of the release paper manufactured in the release paper processing (100) with an acryl resin layer in order to improve a printing eligibility of the surface of the release paper for a convenient digital printing (200), wherein the acryl resin layer to be coated to the surface of the release paper comprises acryl resin mixed with solid contents 10-20 weight %, and solvent organic flux 80-90 weight % with respect to total 100 weight %, and further the acryl resin is coated on the surface of the release paper at 1-5 g per 1 $m^2$;

printing images for printing various designs such as pictures, figures or patterns desired by a customer on the acryl resin layer of the release paper formed in the acryl resin coating process (200) through a digital ink jet printer in order to manufacture transfer paper (300);

bonding a master sheet for bonding the images of the transfer paper manufactured through the image printing process (300) to a master sheet to be transferred (400); and post-treating the master sheet for bonding a surface paper layer or surface reinforcement layer to the surface of the master sheet on which images are transferred after the images are transferred to the master sheet through the master sheet bonding process (400) in order to strengthen duration (400).

2. The method of claim 1, wherein the image printing process (300) comprises the steps of:

selecting images designed and stored by a computer or existing stored picture, figures or patterns by a customer (300-1); and mounting the release paper to a digital ink jet printer and printing the designs selected in the image selection process (300-1) on the surface of the release paper (300-2).

3. The method of claim 1, further including reinforcing the master sheet (600) by forming an adhesion layer over a rear surface of the master sheet after the post-treating process of the master sheet (500) and forming a release paper over the adhesion layer.

4. The method of claim 1, further including mounting a tile to a rear surface of the master sheet.

5. A method of manufacturing interior material, comprising:

providing a release paper;

forming a release agent over the release paper;

forming an acryl resin layer over the release paper, wherein forming the acryl resin layer further includes:

mixing 10-20 % solid contents and 80-90 % solvent organic flux to form the acryl resin layer, and coating the acryl resin layer over a surface of the release paper at 1-5 grams per square meter;

printing an image on the acryl resin layer to form a transfer paper;

providing a master sheet; and mounting the transfer paper to a first surface of the master sheet.

6. The method of claim 5, wherein printing the image on the acryl resin layer further includes printing the image on the release paper using a digital ink jet printer.

7. The method of claim 5, further including forming an adhesion layer over a second surface of the master sheet opposite the first surface.

8. The method of claim 5, further including mounting a tile to a second surface of the master sheet opposite the first surface.

9. The method of claim 5, further including heating the acryl resin layer to transfer the image to the master sheet.

10. The method of claim 9, further including removing the transfer paper.

11. The method of claim 5, wherein the release agent includes silicon.

* * * * *